April 7, 1942.   M. SCHUERMANS ET AL   2,278,567
DEVICE FOR IDENTIFICATION OF VEHICLES
Filed Feb. 23, 1940
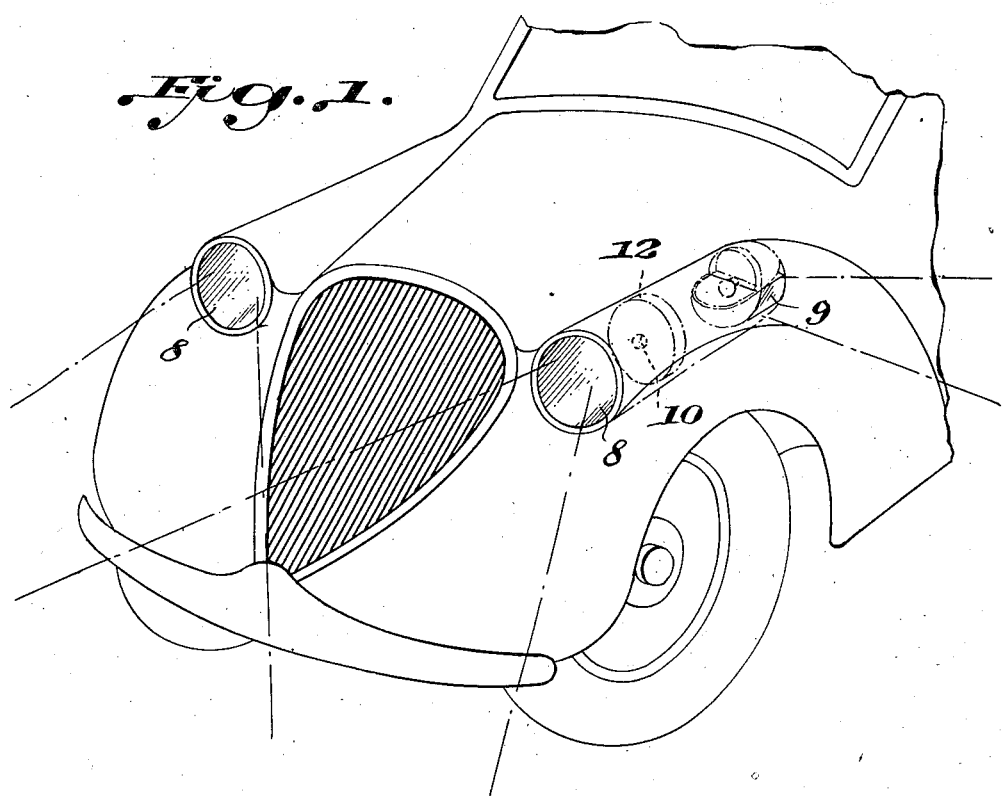
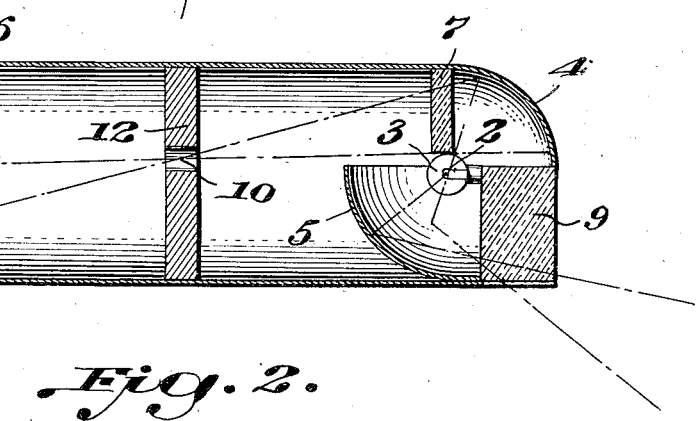
Inventors
MAURICE SCHUERMANS
ALBERT BARET
By Young, Emery & Thompson Attys.

Patented Apr. 7, 1942

2,278,567

UNITED STATES PATENT OFFICE 2,278,567

DEVICE FOR IDENTIFICATION OF VEHICLES

Maurice Schuermans and Albert Baret,
Brussels, Belgium

Application February 23, 1940, Serial No. 320,518
In Belgium March 16, 1939

1 Claim. (Cl. 240—7.1)

The present invention relates to an illuminating device for motor vehicles. An object of the invention is to provide a device which will project light forwardly and downwardly as well as rearwardly laterally and downwardly. It is therefore an object of this invention to provide an elongated casing having a source of light together with reflecting means in order to direct beams of light forwardly laterally and rearwardly, at the same time downwardly relative to these directions. Further objects will be apparent from the following description taken in connection with the accompanying drawing, in which:

Figure 1 is a perspective view of a motor-car equipped with a device constructed according to one form of the invention.

Figure 2 is a longitudinal sectional view of the lighting device.

The device described by way of example comprises light sources such as 2 that are located in the head of the motor-car and arranged symmetrically to the axis of this latter.

Each of the light sources 2 is housed in a bulb 3 arranged between two reflecting surfaces 4 and 5, one of which reflects the rays of light forward, whilst the other reflects them rearward. The luminous source and the reflecting surfaces are mounted in a casing 6 which is closed in front by a lens 8 and behind with a lens 7. Side openings 9 are provided to allow the lateral flux to be directed slightly towards the rear.

At the crossing point 10 of the reflected luminous rays a wall 12 is mounted in which an opening of small diameter is provided.

The luminous fluxes of source 2 cause an illuminating of the portion of ground beneath the vehicle.

It is evident that the scope of the invention is not limited to the exact form of construction described by way of example but is only limited by the claim.

What we claim is:

An illumination device for motor vehicles comprising an elongated casing extending longitudinally of the vehicle at each side thereof within the hood, a lens covering the front of each casing, a source of light at the rear of each casing, a reflector positioned rearwardly and above the light source for projecting a beam of light forwardly and downwardly through the lens in the front of the casing, said casing having an opening in the side adjacent the rear thereof, a reflector positioned forwardly and beneath the light source for projecting a beam of light rearwardly, laterally and downwardly, and a baffle positioned intermediate the ends of the casing at the point of crossing of rays of light projected from the rearmost reflector, said baffle having a small opening therein for the passage of the beam of light.

MAURICE SCHUERMANS.
ALBERT BARET.